(12) United States Patent
Pilla

(10) Patent No.: US 8,677,444 B2
(45) Date of Patent: Mar. 18, 2014

(54) SET-TOP BOX FOR RECEIVING RADIO AND TELEVISION SIGNALS

(76) Inventor: Riccardo Pilla, Milan (IT)

( * ) Notice: Subject to any disclaimer, the term of this patent is extended or adjusted under 35 U.S.C. 154(b) by 467 days.

(21) Appl. No.: 12/921,292

(22) PCT Filed: Mar. 4, 2009

(86) PCT No.: PCT/IB2009/000435
§ 371 (c)(1),
(2), (4) Date: Sep. 7, 2010

(87) PCT Pub. No.: WO2009/109841
PCT Pub. Date: Sep. 11, 2009

(65) Prior Publication Data
US 2011/0016502 A1    Jan. 20, 2011

(30) Foreign Application Priority Data

Mar. 4, 2008   (IT) .............................. MI2008A0356

(51) Int. Cl.
*H04N 7/16*     (2011.01)
*H04N 7/173*    (2011.01)
*G06F 3/00*     (2006.01)
*G06Q 30/00*    (2012.01)
*H04N 5/45*     (2011.01)
*H04N 5/44*     (2011.01)
*H04N 5/50*     (2006.01)
*H03K 9/00*     (2006.01)

(52) U.S. Cl.
USPC ........... 725/151; 725/100; 725/131; 725/139; 725/42; 705/14.4; 348/656; 348/725; 348/731; 348/734; 375/316

(58) Field of Classification Search
USPC ......... 725/100, 131–134, 139–142, 151–153, 725/42, 60–61; 348/656, 725–726, 729, 348/731, 737; 375/316, 320–321; 705/14.4
See application file for complete search history.

(56) References Cited

U.S. PATENT DOCUMENTS

| 5,734,589 | A  | * | 3/1998  | Kostreski et al. ............. 715/716 |
| 5,826,166 | A  | * | 10/1998 | Brooks et al. ................. 725/134 |
| 6,717,522 | B1 | * | 4/2004  | Nagatomo et al. ......... 340/815.4 |
| 7,066,382 | B2 | * | 6/2006  | Kaplan .......................... 235/375 |
| 2002/0074398 | A1 | * | 6/2002 | Lancos et al. ................. 235/382 |
| 2004/0181800 | A1 | * | 9/2004 | Rakib et al. ..................... 725/25 |
| 2004/0215963 | A1 | * | 10/2004 | Kaplan ......................... 713/172 |
| 2005/0166224 | A1 |   | 7/2005 | Ficco |
| 2006/0013555 | A1 |   | 1/2006 | Poslinski |

(Continued)

FOREIGN PATENT DOCUMENTS

| WO | 2005125203 A | 12/2005 |
| WO | 2008025578 A | 3/2008 |

*Primary Examiner* — Hoang-Vu A Nguyen-Ba
(74) *Attorney, Agent, or Firm* — Pearne & Gordon LLP

(57) ABSTRACT

A set-top box for receiving radio and television signals is disclosed in which there is the presence of at least one unit (2) for receiving a signal (S) and at least one unit (3) for sending the received and processed signal (S') to an image and/or sound broadcasting apparatus (4) such as a television set, radio set, PC, iPOD, and any other existing and/or achievable apparatus; means for processing the signal (S) converts said signal (S)—into the signal (S') to be sent through a circuit (5) adapted to allow passage towards the broadcasting apparatus' (4) of information, data, promotions or advertising depending on suitable scheduling of said circuit.

4 Claims, 2 Drawing Sheets

(56) References Cited

U.S. PATENT DOCUMENTS

Figure 1:
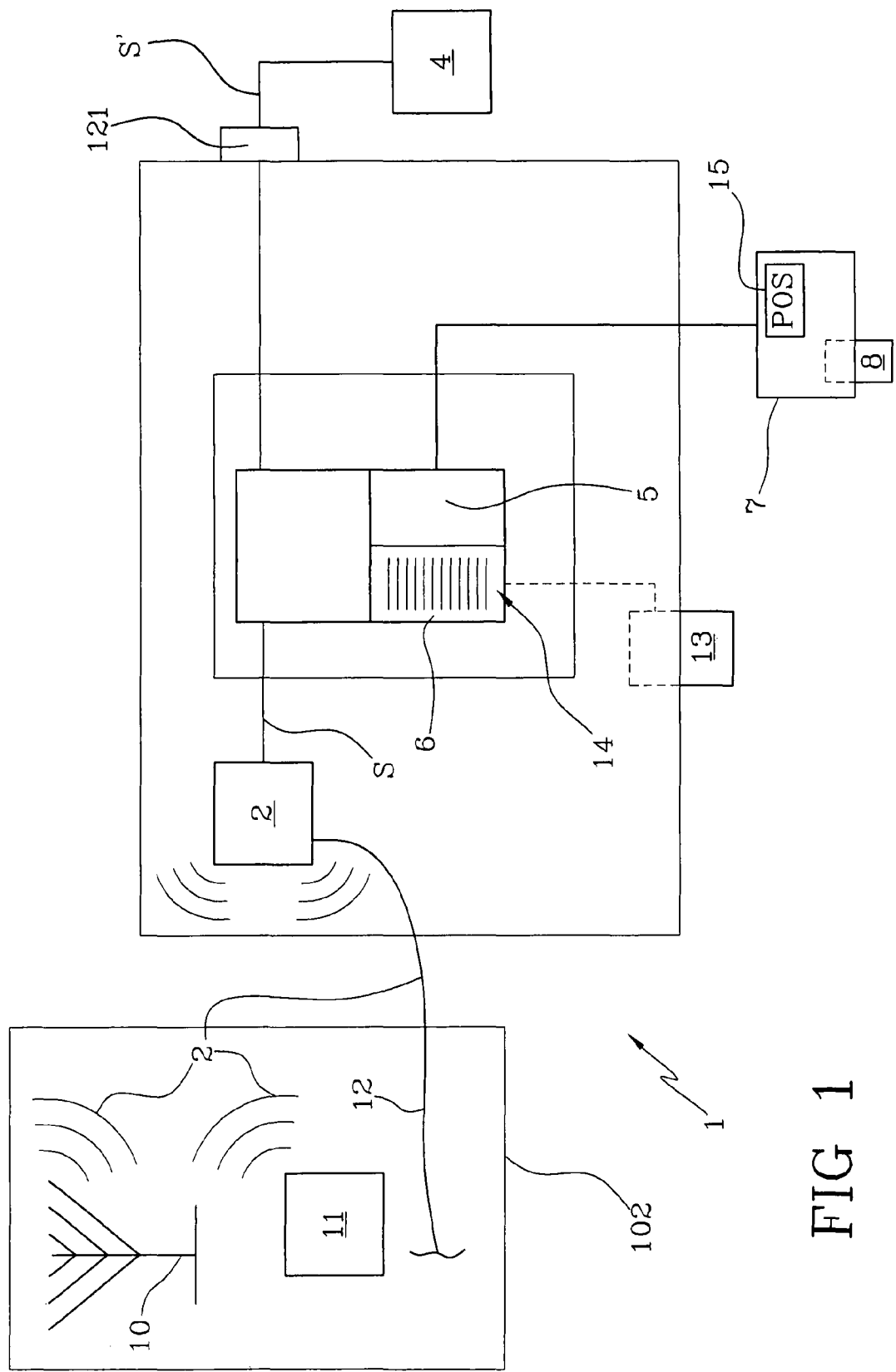

| | | | |
|---|---|---|---|
| 2006/0015904 A1* | 1/2006 | Marcus | 725/46 |
| 2007/0266400 A1 | 11/2007 | Rogers et al. | |
| 2008/0060000 A1 | 3/2008 | Drouet et al. | |
| 2008/0195468 A1* | 8/2008 | Malik | 705/14 |
| 2009/0292611 A1* | 11/2009 | Mager et al. | 705/14.52 |
| 2010/0036724 A1* | 2/2010 | Headings et al. | 705/14.35 |

* cited by examiner

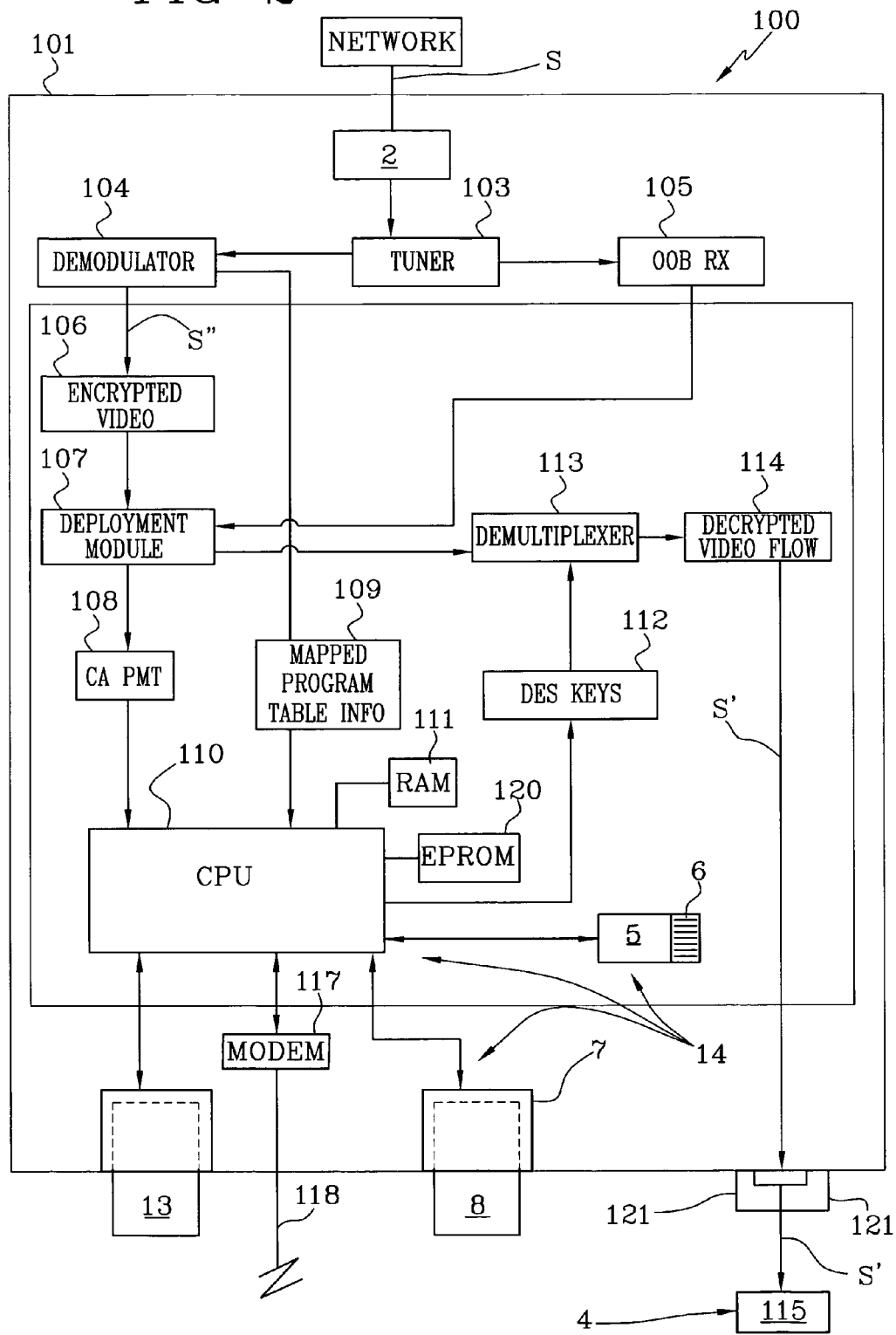

SET-TOP BOX FOR RECEIVING RADIO AND TELEVISION SIGNALS

The present invention relates to a device for signal receiving, and in detail to a television-tuning set-top box, such as a decoder, a mobile or cellular phone or a video-game station and any other existing and/or achievable apparatus suitably designed for performing the aforesaid function.

It is known that there is on the market a great number of apparatus suitable for receiving signals (satellite decoders, digital terrestrial decoders, PC's, videogame stations, such as PlayStations™ videogame station, cellular phones, palmtops, iPOD™'s music player, etc.) receiving audio/video signals via satellite or cable to allow reproduction of same on a television, monitor or the like.

These signals are received in a plain form and immediately displayed or are also received suitably coded and encrypted in such a manner that they can be read and displayed exclusively by use of a decoder or similar device.

At all events the decoder acts as a passive unit, i.e. it receives the signals, if authorised by card, SIM board (Subscriber Identity Module) or others for example, applies the appropriate signal decoding and then transmits the received and decoded signal to the display unit and/or the audio reception unit ((TV, cellular phone, monitor, radio, etc.).

Under this situation, all signals transmitted to the receiving apparatus are addressed to the television and/or radio set or others and displayed and/or converted into sounds.

It is apparent that the selected channel being defined, any type of data, information, promotion, advertising and program is identical for all users or subscribers, irrespective of which of them is reached.

The only chance of variation that subscribers are allowed to do is that of changing the selected channel and therefore receiving the signal directed to a different channel. In particular, it happens that when an unwanted or particularly annoying advertisement or information (weather reports, etc.) reaches a subscriber, he/she immediately changes the channel in question for not watching it.

Therefore, presently the system appears to be very "rigid", because no interactivity or signal customization appears to be possible.

Accordingly, the present invention aims at substantially solving the above mentioned drawback by increasing the services and utilities for subscribers.

It is a first aim of the invention to allow reproduction of information, data, promotion or advertising by the sound and/or image broadcasting apparatus in such a manner that is at least partly dedicated to and customized according to the final user.

It is a further aim of the invention to at least partly enable the final use to carry out a selective choice of the information, data, promotion or advertising that he/she wishes to watch and/or listen to, therefore improving the qualitative perception of the information and/or services reaching him/her.

It is another aim of the invention to allow a remote interactivity by means of fidelity or loyalty cards, credit cards, generic cards, objects, cellular phones and/or any other item and/or existing and/or achievable apparatus, in order to receive discounts, promotions, loyalty points to be spent and/or subsequently acquired (fidelity points) in a supermarket, cinema, bookshop, holiday village, welfare centre, gymnasium or any other commercial concern for purchase of goods, services or others.

Another aim of the invention is to offer the possibility of carrying out radio television loyalty programs by points collection on a generic card, fidelity card and/or any other object and/or existing and/or achievable apparatus.

Another (auxiliary) aim is also to allow a possible remote purchase in a simple and efficient manner, with the possibility of also using (before and/or after the purchase) coupons, handbills, discount vouchers, fidelity cards, credit cards, cashpoint cards, cellular phones and any other object and/or existing and/or achievable apparatus for obtaining discounts, additional services, points of a loyalty program connected to purchase of one item and/or several goods and/or services.

Another aim of the invention is to offer the subscribers or users the possibility of using the system for carrying out true bank and/or financial transactions of any kind, such as reloading of credit cards and cellular phones, purchase and/or sale of securities, carrying out money transfers, payment of bills or others (e.g. authorisation through card and/or credit card, cellular phone or others).

A further aim is to enable unloading of audio and/or video broadcasts in general, ringtones, images, songs, movies, "admission tickets" (codes and/or data) to sports exhibitions, movies, data, codes, on a card/pass, credit card, cellular phone or in any case on objects and/or existing and/or achievable apparatus suitable to receive them.

The foregoing and further aims that will become more apparent in the following of the present description are substantially achieved by a device for signal receiving in accordance with the invention.

Further features and advantages will become more apparent from the detailed description of a preferred but not exclusive embodiment of a device for signal receiving in accordance with the appended claims, This description will be taken hereinafter with reference to the accompanying drawings given by way of non-limiting example, which represent:

FIG. 1 a diagrammatic view of the device for signal receiving in accordance with the invention;

FIG. 2 a simplified block diagram of a television set-top box in accordance with the invention.

As shown, the device for signal receiving, generally identified by reference numeral 1, receives an audio/video signal S that can come via satellite, cable or also ether and generally from an appropriate antenna 10, satellite 11 or cable 12.

The signal from the radio-television network 102 will generally contain audio/video data, text information and other data.

The device for signal receiving or set-top box can be a satellite decoder, digital terrestrial decoder, personal computer, video-game station, palmtop, cellular phone, iPOD™ music player or any other existing and/or achievable apparatus.

At all events this device for signal receiving will internally comprise at least one unit 2 for receiving one signal S of standard nature and therefore not further detailed.

As in all decoders, the received signal S is suitably processed and then sent to the image and/or sound broadcasting apparatus 4 that for instance can be a monitor, television set, display, loud-speaker and/or any other existing and/or achievable image and/or sound broadcasting apparatus. In particular, inside this apparatus 4 a medium 13 is generally present which authorises decoding of the signal usually consisting of a chip-provided card, a SIM board or others, allowing possible decoding of signal S (as better specified in the following).

At all events, reference will be hereinafter made to a set-top box (abbreviated STB) which is an electronic apparatus (generally a non-portable apparatus) adding some television functions or facilities to a television set, monitor or videotape recorder, which facilities are not provided in these electronic apparatus when designed.

The most common functional facility offered by a set-top box is television reception, hence compatibility with one or more television standards.

It is in fact to be noted that a television set is generally compatible with the television standards for an analog terrestrial television which is the most widespread TV type. A television set is hardly ever compatible with other television standards such as those for satellite television, for example.

In addition, monitors or video projectors are electronic apparatus that are not designed to receive TV and therefore always require the appropriate set-top box in combination therewith for performing this function too.

A set-top box appears to be like a metal and/or plastic container of sizes similar to those of a home videotape recorder.

One or more audio/video, connectors 121 (HDMI, YprPh, DVI, SCART, etc.) can be present on the rear side for connection with a device 4 for displaying the images and reproducing the sound.

In addition, still on the rear panel there is an outlet for power supply, or a cable to be connected to the system.

Generally provided on the front side is a display for visually representing information of different kinds.

In addition, performing the function of decrypting the encrypted signal, of a pay TV for example, the set-top box can be provided with one or more slots of the PCMICA type and/or one or more smart card readers.

Finally, obviously present in a set-top box is a switch for switching it on and/or off and possibly also other buttons are present for management of some functions of the set-top box itself.

Usually, the box is further provided with a remote control handset for remote management of all its functions.

The set-top box can consist of different typologies and generally the following can be identified: television tuner, decoder or IRD (an acronym of "Integrated Receiver and Decoder").

In the present discussion reference will be particularly made, although not exclusively, to the two last-mentioned types of electronic devices.

Generally an IRD allows use of digital television in one or more of its different types offering compatibility with the corresponding television standards. For instance, if it allows use of the digital terrestrial television, it is named "receiver" or "terrestrial decoder", if it allows use of the digital television via cable, it is named "receiver via cable" or "decoder via cable", if it allows use of the digital satellite television it is named "satellite receiver" or "satellite decoder".

Generally, with arrival of digital television, the set-top box has become more complicated because within the frequency band generally occupied by a single analog television broadcasting station, 4, 6, 10 or even more digital television broadcasting stations transmit, all coded within the same data flow (in the same band).

Therefore the IRD's task is to extract from this data flow, the one relating to a particular broadcasting station; afterwards it decodes it and possibly, if it is the encrypted one of a pay TV, it decrypts it.

In some cases (i.e. generally when an interactive decoder is concerned), it allows interaction of the user with the television broadcasting station using the telephone line as the return channel; in fact, due to a modem 117 (integrated thereinto or not) the interactive decoder for instance enables the essential payment data to be communicated to the broadcasting station for a particular pay-per-view transmission, or a phone-in vote to be executed, or the subscriber's bank account to be consulted, or also suitable information to be sent to a remote server.

A type of set-top box 100 is shown in FIG. 2.

As above said, the television transmission and reception systems are in a period of transition from types providing analog sending to types providing digital sending.

Generally, the demand of digital television services by the final user is due to the fact that by operating with this technology the resolution and general quality of the (audio and video) digital contents can be increased as compared with the previous analog contents, and the number and types of the offered services can be increased as well.

For the radio-television broadcasting station this imposes many and different requirements among which a safe access for ensuring that only the subscribers of given services can accede thereto, for instance premium channels, pay-per-view channels, video on demand, personal registration functions, on-line games and Internet accesses.

Digital cryptography is one of the most adopted safety measures suitable to protect digital contents. In detail, the digital content is "scrambled" during encrypting in such a manner that only those who are in possess of the decrypting keys can decrypt the signal and receive (display) the content.

For instance, a common encrypting form is known as "Data Encryption Standard" (DES); the same requires exchange of a DES key between a contents supplier and the device adapted to receive them.

The DES key is used for encrypting or "scrambling" the digital content once or more times using particular mathematical methods and only those who are in possess of the DES key (and are acquainted with the mathematical method used) can successfully decrypt the digital content.

The mathematical methods and DES keys are specifically designed for creating substantially insurmountable difficulties when attempts are made to guess or discover the DES key without authorisation by the contents supplier.

For instance, the DES key can consist of a digital bit string in a particular order in which the string can include 56 or more bits. The bit string can be calculated using the public-private key system (for instance the DIFFIE-HELLMAN system).

Further keys can be derived using secure hash algorithms (SHA) and/or the so-called "Dynamic Feedback Arrangement Scrambling Techniques" (DFAST).

In addition, each DES key calculated in this manner can only be used for a short period of time (a few seconds, for example) and then the DES keys can be changed.

In this manner, a person that is not authorised can encounter considerable difficulties in determining many DES keys and decrypting the contents of a whole program in a reasonable time interval (real time), and this can even be impossible.

It is apparent that suppliers of digital televisions, including suppliers of digital television via terrestrial signal, cable, satellite signal, the Internet or others, use the conditional access to enable secure accesses to the program (for instance, using DES digital signal encryption).

The conditional access specifications vary from one contents supplier to another, but all have the same main aim: preventing unauthorised accesses to predetermined programs.

Recently, transmissions (via ether) of conditional access information have been introduced together with the digital content that has to be received, e.g. in the public-private key exchange system, public keys can be transmitted together with and in addition to the audio and video contents.

Besides the conditional access information, the digital television suppliers usually transmit a variety of further information that may be necessary for acquisition of the program or completion of the audio-video data associated with the program itself.

For instance, mapped program tables, information relating to the programs themselves or electronic program guides or others can be transmitted.

Other command or control messages, such as the transmitted information, can be added both within the frequency band and out of the frequency band associated with the selected television program (in other words in band or "IB" or out of band or "OOB").

The other information sent can for instance correspond to the data required for conforming with the different digital audio-video transmission standards, the MPEG2 for example.

This complementary information can supply the final user with information about programming, conditional access, programs and data to be used by the digital receiver for correct processing and correct displaying of the program.

Looking at FIG. 2, a set-top box 100 is therein illustrated, i.e. a system for (digital, for example) television reception in accordance with the invention.

The system 100 comprises a television program receptor 101 having a signal receiving unit 3 to which a tuner 103 is operatively connected, which tuner 103 is coupled to the radio television network 102, a demodulation block 104, an out-of-band receiver/tuner 105, a deployment module 107, a control unit 110 to be coupled to a RAM memory 111, and a demultiplexer 113 which is able to output a decrypted video flow 114 to be sent to a display system or display 115.

In use, a transmission carrier modulated with the audio video signals and a carrier of associated data is received by a broadcasting network through a tuner 103 that can use hardware and/or software to enable tuning of the channel with quadrature amplitude modulation using any known modulation technique.

Tuner 103 can therefore produce a digital output in-band signal that is coupled to the demodulation block 104 and an out-of-band signal that is sent to the out-of-band receiver/tuner 105.

The wording "in-band" (IS) refers to those signals that are transmitted using a frequency carrier associated with television transmission and reception (a VHF channel for example), while the term out-of-band (OOB) refers to signals sent through frequencies associated with the selected television program.

The information contained in the out-of-band signal is sent to the deployment module 107 after being tuned, received and demodulated by the out-of-band receiver/tuner 105.

The output of the in-band signal is demodulated in the demodulation block 104.

The demodulated output of the demodulation block 104 comprises an encrypted digital video signal S" 106 (as well as other encrypted digital signals, audio signals for example) which is sent to the deployment module 107 for decryption.

The demodulated output from block 104 also comprises auxiliary information required for tuning and generating a series of additional information such as, by way of example, electronic guides and programs, information relating to programs, information relating to the mapped program table 109, the latter being coupled to microprocessor 110.

The microprocessor 110 comprises suitable software and hardware, among which the above mentioned RAM memory 111, and creates a mapped program table for conditional access using the information relating to table 109 which comprises the suitable information, according to standards EIA-679-B part B, sections 8.4.3.4, for example.

The television receiver 101 can further comprise other types of memory such as, by way of example, EEPROM memories 120 or also solid-state memories such as hard disks or the like (not shown).

It is then to be pointed out that the television program receiver 101 can also comprise a suitable data transmission system 117, such as a modem, capable of sending suitable information through a transmission line 118, a telephone line for example, to remotely-positioned servers.

The device in accordance with the invention comprises a further unit 3 capable of processing the received signal S and allowing the processed signal S' to be sent through transmission to the television set, cellular display, radio or others.

Generally, this unit 3 carries out the whole processing of the tuned and demodulated signal S" for extracting all necessary audio/video data therefrom and the relevant information of interest for outputting the rebuilt signal S' to device 4.

It is to be pointed out in particular that the receiving unit 2 is adapted to receive signal S containing said audio/video data, text information relating to audio/video data and still other data.

The tuning unit or tuner 103 allows selection of at least one TV channel to be displayed through a frequency-band tuning for example; in particular, tuner 103 allows a tuned signal S" to be extracted from signal S, which tuned signal S" contains at least the desired audio video data relating to the selected TV channel.

Actually, as mentioned above, the tuned signal S" will contain the audio video data and the information relating to a plurality of TV channels transmitted from the same broadcasting station and all inserted in the same band of carrier frequency.

At this point unit 3, by, virtue of the means 14 for processing the tuned signal S", enables the audio/video data of the selected channel to be extracted from the tuned signal S" and also allows rebuilding of a processed signal S' which will be the input of the image and sound broadcasting apparatus 4 for reproduction of the selected channel.

In other words, the received signal S contains all audio/video data, information, etc. that are digitally transmitted, the tuner and demodulator enabling the information contained in the desired frequency band to be retrieved, and the processing means of the tuned signal S" enabling the audio/video data exclusively relating to the selected channel to be retrieved within the selected band.

In this way the processed signal S' sent to display 115 will allow reproduction of a single desired channel.

At this point it is to be noted that the audio/video data of the selected channel contained within the processed signal S' are generally divided into a first part of data relating to the program—the movie or broadcast that is wished to be watched for example—that is being transmitted on the selected channel, and a second part of data relating to advertising and/or promotions that are suitably transmitted alternatively to the data relating to the program, before or after a movie for example, or also during the broadcast program.

Generally however, said first part of data and second part of data are sequentially represented in subsequent moments. In other words, unit 3 substantially sends the first part of data to the broadcasting apparatus in real time while said second part of data relating to advertising and/or promotion is further processed by means 14 as better highlighted in the following.

In fact, advantageously said means 14 for signal processing comprises a circuit 5 adapted to allow passage towards said broadcasting apparatus 4 of said second part of data relating to promotion or advertising as a function of a suitable programming of said circuit.

In fact, in the system in accordance with the invention it is contemplated that the audio/video signal emitter consisting of one or more of said satellite 11, antenna 10 or cable 12, in addition to sending the normal audio video signal (containing a movie, a broadcast program or the like) to device 1 for signal receiving, also sends a plurality of second alternative parts of data for displaying different promotions or advertising.

Each second part of data containing promotion or advertising messages will be provided with a respective identification code enabling a selective division and separation of same in a prearranged manner.

For instance, each information, promotion or advertising message relating to "journeys" will have a certain type of identification code, while information, promotion and advertising messages relating to "games" will have a different code, and so on.

It is apparent that separation of information, promotion and advertising can be of any nature depending on current requirements.

Under this situation, the means 14 for processing signal S, contained in the device 1 for signal receiving will be provided with a memory 6 having a plurality of codes. These codes will correspond to one or more of the codes associated with the second parts of data relating to promotion or advertising; in particular, circuit 5 will allow passage to the broadcasting apparatus 4 of the only parts containing an identification code that is coincident with a code contained in memory 6.

In this manner, not all the pieces of information, promotion or advertising will be transmitted to a monitor or display of a television set. In fact, these second alternative parts of data cannot be all broadcast because they are mutually simultaneous and circuit 5 will be adapted to exclusively determine one of these second parts for display.

Exclusively the information, promotion and advertising messages containing an identification code that is coincident with one or more of the codes contained in memory 6 can be displayed, or only those promotions and/or advertising messages with one or more codes (predetermined by the subscriber and/or the broadcasting station) with priority over other codes can be displayed.

Since the device for signal receiving in accordance with the invention can be programmed both by the subscriber and the broadcasting station also several times, it is possible to vary the information, promotion and advertising to be displayed and/or to be converted into sounds.

Generally, the signal processing means 14 is remotely controlled through reception of a program planning (scheduling) by the subscriber and/or by the broadcasting station on the subscriber's signalling (call centre, filling in of a form or others), or based on criteria selected by the broadcasting station itself.

In other words, scheduling is a "subscriber's profiling", i.e. said subscriber can create a profile of topics of his/her interest (for instance, football, wines, history books and others) so that he/she will receive (will watch) only information, promotion, advertising of his/her interest, the remaining material being filtered.

Practically, if family X watches the same movie as family Y, when advertising occurs, family X will receive advertising on detergents, while family Y will receive advertising on the ski resorts they are interested in.

Likewise, taking into account weather reports for example, both families will receive information about the weather but for the places they have expressly selected, i.e. family X may receive information on the weather in the mountains for example, while family Y at the same instant on the same channel will watch information concerning the weather in a holiday resort at the seaside where they want to go.

In addition it is to be noted that, should the decoder be also adapted to decrypt suitably hidden or masked programs, the same would provide a suitable slot for receiving a subscription card adapted to contain the parameters enabling decryption of the received programs.

For instance, the subscription card can contain a suitable software or firmware that is remote rewritable, in which the parameters establishing which TV packages can be decrypted and which not are inserted.

By way of non-limiting example only, the television producer can remotely send a public decryption key relating to the subscription package and this key can be stored on said subscription medium. By this key it will be possible to carry out decrypting exclusively of the channels the subscriber has paid for.

Should a modification in the subscription take place, the related key would be correspondingly modified.

In addition, it is to be noted that the broadcasting station can periodically (even at rather close time intervals) send subsequent modifications of the public key in such a manner as to make cloning of the card more difficult.

The subscription card itself in an alternative embodiment can contain one or more codes (susceptible of modification by the broadcasting station and/or the subscriber); in this case the decoder will only filter the information, promotions, advertising corresponding to the codes stored in the subscription card.

It is to be noted that the set-top box is also provided with at least one card reader 7 adapted to allow reading and/or writing on a promotional and/or advertising card (by way of example only, a fidelity or loyalty card, a credit card, a generic card) and in particular reading of at least one code contained in the card or writing of at least one code directly on the card.

The adopted card can be of the RFID type, chip type, with a microprocessor or also a magnetic band (or a bar code read by reader 7) or any other existing and/or achievable technology.

Generally this card reading/writing is carried out during display on apparatus 4 of advertising and/or promotional messages of the interactive type. In fact, the above described structure allows a plurality of additional functions to be implemented in the decoder, which functions are very advantageous.

In fact not only the set-top box allows display of advertising and/or promotions (contained in the second part of data) in an at least partly customized manner, but also enables interaction therewith.

In fact, said second part of data, in addition to containing promotional and/or advertising information, can also contain suitable codes that, upon authorisation of the subscriber who is watching the promotion and/or advertising and/or a program, can be directly written on the card inserted in the reading/writing unit 7 so that they can then be used in the appropriate places.

Let us think for instance about a discount for a film, a promotion for a gymnasium, a collection of points following watching of a program, one or more series of programs or others.

Alternatively, and still upon authorisation by the subscriber, a code contained in the card (that can also be quite anonymous as well as enabling identification, or linked or not to the card's owner) can be sent through remote sending means 117 to a central-management server that will then be able, at a second time, during a transaction, to confirm the right by the card's owner to a discount, promotion, prize to which the subscriber is entitled due to a collection of points for being watching a program and/or a series of programs, or others. In other words, use of said card allows the set-top box as above described to become interactive.

Among the predictable possibilities there is also that of automatically loading a promotion, points or others upon command of the control unit 110, for instance fidelity points after repeatedly and continuatively watching a predetermined program.

It is also to be noted that the interactive reading/writing unit 7 adapted to receive the subscriber's card 8 (that can be any existing and/or achievable object that can at least perform this function) will be able to modify the codes contained in memory 6, for example.

As an alternative, these codes can be remotely modified by means of other elements such as remote control devices or the like.

In particular the interactive reading/writing unit 7 is a reading/writing apparatus for fidelity cards, credit cards and other cards, watches, key-holders, gadgets, cellular phones or similar media and/or apparatus for example incorporating RFID technology, contact chip technology and/or any other existing and/or achievable technology; the interactive reading/writing unit 7 is either externally (in a removable manner) or internally (in a fixed manner) associated with the device for signal receiving, or can also alternatively be implemented in the remote control handset of the apparatus, so that it can wireless communicate with the latter. In other words, this reading/writing apparatus 7 can be used in addition to the "subscriber's profiling" determined by use of circuit 5 or also in a quite independent manner.

In this second mentioned case all subscribers will receive the same promotion and/or information and/or advertising and the reading/writing apparatus 7 will have the function of enabling loading of a discount, a promotion, or fidelity points on the television fidelity card, credit card or similar card, loading of money on the credit card, loading of a ringtone, photo, song, video on a cellular phone, loading of a song on an iPOD™ music player, of an "admission ticket" for instance for a movie or a sports exhibition on a card and/or a cellular phone at the moment the television set, monitor or at all events the sound and/or image broadcasting or reproducing unit 4 will show a corresponding advertising, information or promotion.

In other words, the subscriber, pressing the remote control button upon request for example, will obtain loading of a discount and/or points (fidelity program for television) on his/her own fidelity card, of a ringtone on the cellular phone, of money on the credit card, of an "admission ticket" for a movie, the ground, etc. on a card.

Differently said, when advertising concerning a given product appears on the TV screen, possibly with a written request to press a given key, when the operation is carried out the promised discounts will be loaded so as to enable use of same in supermarkets, commercial concerns, cinemas, airports, railway stations and all trading centres and services having an arrangement.

In fact, if in these places the subscriber shows his/her card, cellular phone, gadget, key-holder or others with the loaded discount, he/she will be able to obtain automatic accounting of the promised discount.

Clearly, the promotion, information, advertising can be of any nature linked to services and/or products such as admission in museums, discounts on books, cinemas, petrol, promotion points of any kind.

In addition, if while a subscriber is watching a program, the notice for points collection appears and the subscriber presses a given key, a given number of loyalty points will be loaded on the card and/or the gadget and/or the apparatus. On reaching of a predetermined number of points the subscriber will be able to go to any business concern having an arrangement and obtain a prize or automatic accounting of one or more discounts or others.

It is apparent that the reading/writing unit 7 can be a remote reader or writing unit of the RFID type, contact chip type or ultrasonic wave type and/or any other existing and/or achievable technology to be used for both creating and modifying the subscriber's own profile, or configuring the choice of the information, promotion, advertising and/or also of the channels and/or functions of the apparatus.

It is finally to be also noted that the reading/writing unit 7 can have the POS function, i.e. can enable remote purchase of a given product by financial transaction. In other words, the reading/writing unit 7 can be able to receive a credit card, a cashpoint card, a cellular phone and any other medium and/or existing and/or achievable apparatus having at least the function of electronic money in such a manner that by watching telesales, a "normal" advertising or the like it is possible to purchase a product following the instructions on the screen and/or pressing the mentioned suitable keys of the remote control handset, or the keyboard.

It is apparent that the system could also be operated by use of a cellular phone that does not have the function of electronic money, should the telephone company allow it and the corresponding charge will take place on the cellular SIM card.

From an operating point of view, the method in accordance with the invention allows display of dedicated data, information (e.g. weather reports), promotion, advertising.

In fact, once the signal containing the predetermined number of data, information, promotions or advertising has been received, each of which can be identified through a respective code, the latter is compared with the series of previously stored subscribers' codes and passage to video and/or audio is exclusively allowed for data, information, promotion, advertising provided with the code that is coincident with the prestored subscriber's code.

In this manner and by virtue of the fact that the subscriber's codes can be programmed as a function of the subscriber's requirements and also remotely, the information shown on television is filtered and made more interesting and attractive for the consumer.

The invention achieves important advantages.

As compared with "static" systems presently on the market, the device for receiving signals appears to be greatly more performing. The same is attractive for the user that will be able to select the information, advertising and promotions he/she is interested in, as a function of the entered codes.

The system appears to be very advantageous also for the companies interested in advertising their goods as well as for the advertising agencies, because the advertising messages will be directly addressed to the subjects that are the most interested in them.

In other words the advertising message, information or promotion will be directly addressed to the interested people, reaching the goal without estimates, studies or configurations being required upstream of the transmission.

In this manner those dealing in the different sectors will no longer be obliged to spend huge amounts of money for market researches or similar operations that will never reach the same accuracy as the described invention according to which a selection is made by the subscriber or user based on his/her preferences and tastes.

In addition, the possibility of loading discounts, promotions or points directly on a loyalty card, credit card, cellular phone, the possibility of loading ringtones, images, songs, movies on the cellular phone or any other apparatus, the possibility of loading money on the credit card, the possibility of loading "admission tickets" for stadiums, cinemas, expositions, concerts or the like on media (cards, credit cards, gadgets, key-holders, etc.) and apparatus (cellular phones, iPOD™ music player, palmtops, etc.), the possibility of carrying out financial and bank transactions such as payment of bills, money transfers, purchase of securities together with the possibility of also carrying out remote purchase operations, with the possibility of using discounts and/or promotions in a simple and efficient manner, greatly increases the system's attractiveness.

It is finally to be pointed out that traditional known systems presently on the market can be merely modified through software in a simple manner so as to allow operation of same in accordance with the invention as above described.

In other words, new hardware or substantial modification of the existing one is not required for operation and for reaching the above highlighted aims.

The invention claimed is:

1. A method of displaying dedicated information, promotions and advertising in a set top box for receiving radio and television signals having:
    at least one unit for receiving a signal containing at least audio and video data, text information relating to audio and video data and further data;
    at least one tuner allowing selection of at least one television channel to be displayed by frequency tuning, said tuner being configured for extracting from the signal a tuned signal containing at least the desired audio and video data relating to a selected television channel;
    at least one unit for sending a processed signal to an image and sound broadcasting apparatus, chosen in the group including a display and a television set, said unit comprising means for processing the tuned signal, enabling the audio and video data of the selected channel to be extracted from the tuned signal and the processed signal for the image and sound broadcasting apparatus to be rebuilt;
    at least one card reader configured to read and write on a promotional and/or advertising card, said card reader being selectively configured for reading of at least one code contained in the promotional and/or advertising card and writing of a code on the promotional and/or advertising card, the audio and video data of the selected channel being divided into a first part of data relating to the program being transmitted on the selected television channel and into a second part of data relating to advertising, said card reader being configured for reading on the promotional card out concurrently with broadcasting of said second part of data through the apparatus, the method comprising the following steps:
    receiving, through said unit, a signal containing at least one predetermined number of information, promotions and advertising messages, each of them being identified through a respective code;
    comparing each code of said information, promotions and advertising messages with a series of subscriber's pre-stored codes present in said promotional and/or advertising card;
    permitting passage of a processed signal that, among all pieces of information, promotion, advertising, contains the only information, promotion and advertising messages provided with a code that is coincident with a pre-stored code of the subscriber present in said promotional and/or advertising card; and
    broadcasting, concurrently with said phase of permitting, said second part of data through the apparatus.

2. A method as claimed in claim 1, wherein the subscriber's codes is programmed as a function of the subscriber's requirements.

3. A method as claimed in claim 1, wherein the subscriber's codes are remotely programmed by a remote control handset.

4. A set-top box for receiving radio and television signals, comprising:
    at least one unit for receiving a signal containing at least audio and video data, text information relating to audio and video data and further data;
    at least one tuner allowing selection of at least one television channel to be displayed by frequency tuning, said tuner being configured for extracting from the signal a tuned signal containing at least the desired audio and video data relating to a selected television channel;
    at least one unit for sending a processed signal to an image and sound broadcasting apparatus, chosen in the group including a display and a television set, said unit comprising means for processing the tuned signal, enabling the audio and video data of the selected channel to be extracted from the tuned signal and the processed signal for the image and sound broadcasting apparatus to be rebuilt;
    at least a promotional and/or advertising card configured to be read and/or written, said card is configured to contain at least one code relating to a data of a advertising program, said data having at least a first part relating to the program being transmitted on the selected television channel and a second part relating to advertising;
    at least one card reader configured to read and write on said promotional and/or advertising card, said card reader being selectively configured for reading of at least one code contained in the promotional and/or advertising card and writing of a code on the promotional and/or advertising card, the audio and video data of the selected channel being divided into a first part of data relating to the program being transmitted on the selected television channel and into a second part of data relating to advertising, said card reader being configured for reading on the promotional and/or advertising card out concurrently with broadcasting of said second part of data through the apparatus.

* * * * *

UNITED STATES PATENT AND TRADEMARK OFFICE
CERTIFICATE OF CORRECTION

PATENT NO.      : 8,677,444 B2
APPLICATION NO. : 12/921292
DATED           : March 18, 2014
INVENTOR(S)     : Riccardo Pilla Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 469 days.

Signed and Sealed this

Twenty-ninth Day of September, 2015

Michelle K. Lee
*Director of the United States Patent and Trademark Office*